Patented Jan. 6, 1948

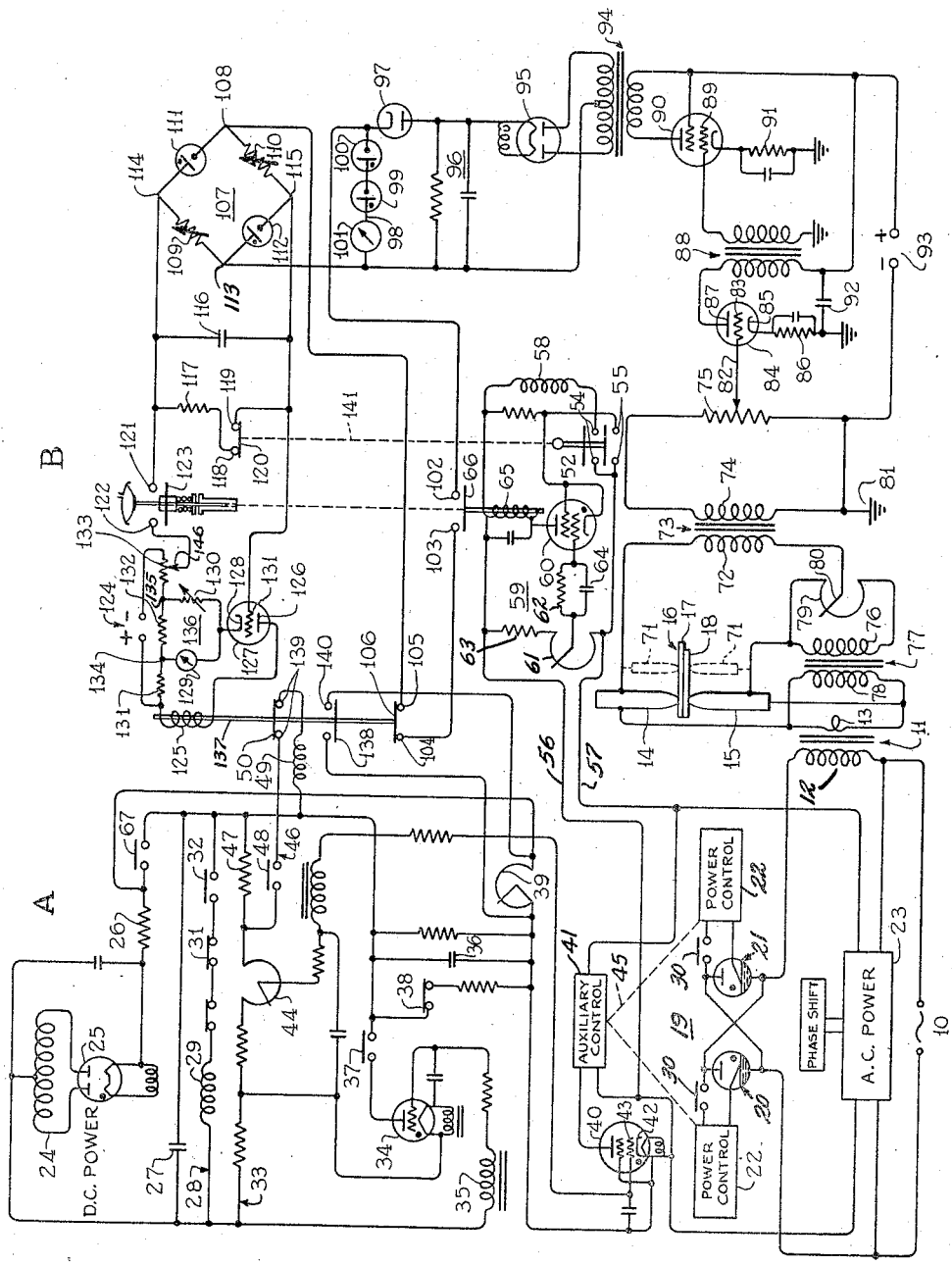

2,433,827

UNITED STATES PATENT OFFICE 2,433,827

WELD-CONTROL SYSTEM

Edwin M. Callender, Cynwyd, Pa., assignor to The Budd Company, Philadelphia, Pa., a corporation of Pennsylvania Application May 3, 1944, Serial No. 533,977

11 Claims. (Cl. 219—4)

This invention relates to resistance welding and more particularly to methods and apparatus for controlling the power supply to the weld point in the type of resistance welding known as spot welding.

In spot welding there has developed in industry sensitive means of controlling the timing of a spot weld, as well as the heat supply thereto, which is dependent upon electronic devices and circuits for controlling the extent of time and the amount of heat effective at the weld. In the timing means employed in these electronic systems cut and try methods are used to determine the precise time interval during which energy is to be supplied the weld point of the workpiece and similar methods are also utilized to determine the quantity of heat energy to be transmitted per half-cycle of the alternating current input.

One of the primary objects of the present invention is to provide means for controlling the time and energy input into the weld which may be dependent entirely upon the physical transformation occurring at the weld brought about by fusion of the metal of the workpiece. Another object of the invention is to associate means effective at the weld in combination with a control of the amount of the half-cycle of input current energy which may be effective at the weld. Still another object is to supply circuit arrangements and devices which act positively to interrupt the starting control circuit of the welding system upon a change of voltage occurring at the weld resulting from fusion of the workpiece at the weld point. An object, also, of the invention is to provide a weld control bridge to act as a sensitive trigger to supply substantial power for operating circuit opening contacts in the starting control circuit.

Additional objects of the invention include means for associating conventional timing and heat control circuits with an automatic weld control circuit whereby a parallel action of these groups of circuits may be made simultaneously effective; to provide, in conjunction with automatic weld control means, visual means for indicating the completion of a weld in the workpiece; to provide means which may be applicable to any standard control circuit for spot welding; and to provide in an automatic weld control circuit means for overcoming transient inductive voltages unassociated with the change of voltage due to weld at the workpiece.

A form of the invention, which may be preferred, is illustrated in the accompanying figure showing diagrammatically a circuit in which the weld control system is interconnected with a known form of welding control having manual determination of the time of weld and the amount of energy supplied to the weld.

Referring to the figure in the left-hand A section thereof is indicated a spot welding control arrangement including a source of alternating current power adapted to be connected to the welding transformer, translating means including a power control for supplying power to the welding transformer in successive half-cycles of current flow of source current, a source of direct current power, a safety control circuit, a starting control circuit, and timer and heat control circuits for determination of the specific conditions affecting the weld. In greater detail, from the source 10 alternating current is supplied to the welding transformer 11 having a primary 12 and secondary 13, the welding electrodes 14 and 15 being in series with the secondary 13 and adapted to contact each side of a workpiece 16 usually formed of two overlying plates 17 and 18 and exert pressure thereupon. The source current also is transmitted through a translating device 19 of conventional form including ignitrons 20 and 21 inversely connected together so as to transmit current to the welding transformer 11 on alternate half-cycles of incoming alternating current. Power control means 22 are associated with these rectifying ignitrons to activate the same at the proper point in the half-cycle.

From the incoming source terminals 10 current is also supplied the alternating current transforming means 23 by means of which at appropriate voltages alternating current is supplied to certain sections of the controlling circuits including the heat control circuit. From this alternating current means direct current power 24 is obtained utilizing appropriate rectifying means 25 associated with requisite filtering elements such as the resistor 26 and capacitor 27. Bridging the direct current power lines is the safety control circuit 28 including the relay 29 effective on the contact switches 30 of the ignitron power control circuits, the thermo-flow switch 31 of the cooling system and safety switch 32. Also connected across the direct current power lines is the timer circuit which includes the voltage divider 33, the triggering tube 34, peaking transformer 35, capacitor 36, starting control contact switches 37 and 38 and potentiometer 39. Also, associated with this circuit is the leading tube 40 of the leading-trailing tube unit. This tube operates to initiate the control sequence in conjunction with the trailing tube included in the boxed unit 41 for controlling the action of the power control unit 22. The tube cathode 42 connects to the timer capacitor 36 and the timer potentiometer 39; the tube control grid 43 connects to potentiometer 44. Dotted lines 45 indicate the power connection between auxiliary control 41 and power control 22.

The starting control circuit 46 is also connected to the voltage divider between the potentiometer 44 and the resistor 47, the same including the starting contact switch 48 operated by a relay connected to the manual initiating switch, the relay coil 49 adapted to operate timer circuit switches 37 and 38, and the normally closed switch 50 operable by the weld control circuit as hereinafter described.

The initiating switch 52 is shown as positioned in the B circuit section and formed of two sets of contacts, 54 and 55. Contacts 54 lead across conductors 56 and 57 connecting to the A. C. power source 23, through relay 58. Relay 58 when energized closes the starting circuit switch 48 to start the welding cycle. Contacts 55 also close a circuit between conductors 56 and 57 through the time delay unit 59 which delays energization of the weld control B circuit for a time interval of about one and one-half cycle in a sixty cycle circuit in order to permit proper development of operating voltages in this circuit. Use is made of the gas tube 60, grid controlled with the aid of potentiometer 61 and resistors 62 and 63 and capacitor 64 to permit functioning of relay coil 65 and contact switch 66. By adjustment of the potentiometer the amount of time delay of activation of relay 65 may be varied.

The circuits, as hereinabove described, have been included so as to make clear the application of the weld control circuit which forms the right side B of the drawing. Briefly reviewed the operation of the circuit source approximates this sequence. With appropriate activation of cooling and pressure devices and of the main power switches the operator brings about a closure of the time delay switch 67 when the direct current voltage is effective on the safety control, timer, and heat control circuits. After the safety control circuit is closed the relay 29 functions to close the switches 30 in the ignitron power control circuits. Also, the closure of switch 48 in the starting control circuit operates relay 49 to bring about the closure of timer circuit switch 37 to permit current flow through the triggering tube 34 on energization of peaking transformer 35 by the alternating current power source 23. This initiates the timing cycle. Heat control is determined by the setting of the phase shift dial whereby the precise point in the half-cycle at which the heating energy flows to the weld is predetermined.

Adapted for association with the typical spot welding control system, hereinabove described, is the weld control means B dependent upon the physical conditions at the point of weld. Extensive experimentation has determined that, prior to formation of the fused weld nugget, the voltage across the workpiece at the electrode tips is, generally speaking, constant. As soon as fusion begins at the interface of the workpiece plates there is a rapid diminution of electrical resistance which brings about a pronounced drop in the voltage across the weld amounting to as high as 25% for many cases of work thickness. The function of the weld control circuit B is to take advantage of this drop in potential at the weld after the weld has been completed to bring about an opening of the starting control circuit and stop the flow of welding current.

In the utilization of this potential drop, connections are made directly to the welding electrodes 14 and 15 although in some cases it may be advantageous to employ separate contact electrodes 71, as indicated by dotted outline, which should be positioned in close proximity to the main electrodes in order to be subject to the weld conditions. The electrodes 14 and 15 are connected together through the primary 72 of a step-up transformer 73 having a secondary coil 74 in closed circuit with a potential dividing resistor 75.

The circuit of the voltage pick-up connections also includes the secondary 76 of a transformer 77, the primary 78 of which is connected about the secondary 13 of the welding transformer. The transformer 77 tends to neutralize the induction effective on the conductors leading from the electrodes. For this purpose the coil winding of the transformer 77 is such as to oppose the induction transmitted to the auxiliary electrode circuit of the welding transformer. The secondary 76 of the bucking transformer 77 is connected through a potentiometer 79, the movable arm 80 of which forms part of the primary circuit of transformer 73.

The potential divider 75, which is grounded at 81, has connection through a slider 82 to the grid 83 of a voltage gain tube 84. The cathode 85 of this tube is grounded through a biasing resistor 86 and the anode 87 of the tube is connected through a step-up transformer 88 to the control grid 89 of an amplifying audio-type tube such as the tetrode 90. The secondary of the transformer 88, as well as the cathode of the tube, is grounded—the latter through a biasing resistor 91. Also, the primary of transformer 88 has connection through a capacitor 92 to ground. Direct current supply, as around 400 volts, for application to the anodes of tubes 84 and 90 is indicated at 93. The output of the amplifying tube 90, connected as indicated in the drawing, is stepped-up and rectified by transformer 94 employing the rectifying tube 95 and a resistance capacitor filter 96. A conductor leads from the positive side of this filter through a second rectifying tube 97 to a constant potential bridge 98 between the positive and negative conductors of the rectified circuit, the bridge 98 including the glow tubes 99 and 100 in series and a milliammeter 101 or some system to show the passage of current. The positive side of this constant potential unit then leads through contacts 102, 103 of normally open switch 66 and contacts 104—105 of normally closed switch 106 to a bridge circuit 107 at point 108 thereof. This bridge is formed by series connection of resistors 109 and 110 with glow tubes 111 and 112 interposed between the resistors, the point 108 indicating the junction between resistor 110 and glow tube 111 and the point 113 indicating the junction between resistor 109 and glow tube 112. To point 113 is connected the negative side of the constant potential circuit 99—100.

Junction points 114 between resistor 109 and glow tube 111 and 115 between glow tube 112 and resistor 110 are by-passed by capacitor 116, resistor 117, and normally closed contacts 118 and 119 of switch 120 in parallel with the capacitor 116. The conductor from point 114 of the bridge also extends through contacts 121 and 122 of switch 123 to the negative terminal of a source 124 of direct current, through the adjustable relay coil 125 to the anode 126 of the vacuum triode 127. This tube is provided with a cathode 128 which connects through the voltmeter 129 in parallel with the variable resistor 130 to a voltage divider including resistors 131, 132 and 133 connected across the fixed voltage source 124. The voltmeter is connected to point 134 between resistors 131 and 132 and the variable resistor 130 to a point 135 between resistors 132 and 133. The resistor 133 is connected by a variable contact 146 to switch 123. It is pointed out that resistor 130, 131 and 132, tube 127 and relay 125 form a second bridge 136 across which the voltmeter 129 is connected, so that resistor 130 may be adjusted for no reading on the voltmeter. The grid 131 of tube 128 leads to the point 115 of the bridge 107. The bridge 107, as described, with the associated switches 120 and 123 and secondary bridge 136 is hereinafter referred to as the "bridge circuit."

Connection between the relay coil 125 and the starting control circuit of the conventional spot welding circuit, as illustrated in section A of the drawing, is made through appropriate apparatus including the movable core element 137 to which are connected the switch contact plates 50, 138 and 106. As hereinabove mentioned, the plate 50 functions to open and close the contacts 139 of a normally closed switch in the starting control circuit including the relay coil 49; switch 106 functions to close contacts 104 and 105 of the normally closed switch in the positive branch of the rectified circuit intermediate the rectifier 97 and the bridge point 108; plate 138 is part of the switch having normally opened contacts 140 in circuit by-passing the potentiometer 39 in the timer circuit. It is accordingly apparent that, when the relay 125 is energized, it will function to open the switches 50 and 106 and close switch 138. The opening of switch 50 immediately de-energizes relay coil 49 which breaks the current flowing in the triggering tube 34 and brings about an immediate opening of the welding current circuit. Closure of switch 138 by-passes potentiometer 39, and impresses a zero resistance in the charging circuit for capacitor 36 whereby the cathode of tube 40 is made positive in about one and one-half cycles. This affords an alternative opening means for the welding circuit. Opening of normally closed switch 106 disconnects the bridge circuit 107 from connection to the rectified power source so that the capacitor 116 may retain its charge and maintain the vacuum tube voltmeter circuit effective to indicate the drop from no weld to weld condition after weld completion. The normally closed switch 120 has connection to the initiating switch 52 and on opening of the initiating switch a circuit through resistor 117 is closed to discharge the capacitor 116.

Having described the essential elements of the conventional control A and the associated weld control circuits B, as illustrated in the figure of the drawing, the mode of use may be briefly summarized. Electrical power is applied in circuit A by closure of necessary switches, including those controlling the pressure and cooling systems equipment, electrodes 14 and 15 of the welding apparatus being in position, as shown in the figure, to supply heating energy to the workpiece to form a weld therein. Adjustment is made of the timing control so that the time of weld for any given spot weld is in excess of the maximum time, as determined by test, necessary to complete a normal weld in the workpiece. By normal weld is meant one in which fusion occurs of a minimum amount of metal that on solidification affords the maximum attainable strength consistent with the avoidance of undesired effects upon the metal in and at the region of the weld nugget.

The initiating switch 52 closes in the starting control circuit and brings about the application of power through the welding transformer to the electrodes. As soon as current is applied to the weld point and the time delay circuit 59 has timed out, through the transformer and amplifying tube system, the electrode voltage is multiplied, rectified, filtered, and impressed on the constant potential circuit 99—100 and bridge circuit 107, a brief time interval intervening between closure of switch 66 and switch 123 so that the voltage is constant on the bridge when switch 123 is closed. The resistances 109 and 110 are now preferably adjusted so that the potential drop on series glow tubes 99—100 is just above the striking point. Tubes 99—100 of the constant potential circuit and 111—112 of the bridge circuit have the same voltage characteristics as, for example, 150 volts for values less than 30 milliamperes and consequently current passing from point 108 to 113 in the bridge circuit establishes equal potential points at 114 and 115 which are ineffective on the bridge circuit since at zero potential the grid 131 of tube 128 does not affect the vacuum tube voltmeter circuit which is adjusted for zero reading on the voltmeter. When, however, due to the formation of the molten nugget in the workpiece, the resistance through the weld diminishes, the potential impressed on the constant potential circuit 99—100 drops, deenergizing tubes 99—100 and making the reduced voltage effective between bridge points 108—113. This results in a reduced flow of current through the resistors 109 and 110 and consequently, a pronounced difference in voltage between points 114 and 115 of the bridge circuit which permits the charging of capacitor 116 and the placing of a positive potential on the grid of tube 127. Immediately tube 127 becomes more conductive energizing adjustable relay 125 and opening the starting control circuit switch 50 and the switch 106 in the positive conductor between the bridge circuit and the constant potential circuit.

Since, on the establishment of a potential difference between the points 114 and 115, the capacitor 116 is charged, when switch 106 opens in the positive conductor of the bridge supply circuit the potential impressed upon the control grid of tube 127 is fixed at a positive value. Accordingly, current from the voltage source 124 is maintained through the relay 125 and meter 129 continuously until switch 120 is closed. This switch may be conveniently positioned on the back of the initiating switch of the circuits as indicated by dotted line 141 so that closure thereof occurs after opening of the initiating switch permitting discharge of capacitor 116 and opening of the circuit through relay 125.

It is pointed out that the vacuum tube indicating and relay circuit including the tube 127, voltmeter 129 and relay coil 125 which together constitute a metering device, has been found useful but other indicating means may be substituted therefor. This circuit may be designated a vacuum tube voltmeter circuit and the meter calibrated to read percentage drop of signal.

The time delay relay 59 as shown in the B section of the circuit is effective to secure the desired time delay in the closure of switch 66. However, in some cases I have found it preferable to utilize instead of the capacitor-resistor potentiometer branch circuit as shown, a circuit connected in series with one of the series constant potential glow tubes 99—100 as tube 99. This alternative arrangement operates to bring about closure of switch 66 when the full potential is effective to pass current through the glow tube 99.

Modifications other than described hereinabove may of course be made and hence no limitation is intended in the disclosure other than may be required by the scope of the claims hereto appended.

What is claimed is:

1. In an electrical system, a load circuit, and combined lockout and indicating apparatus connected therewith, said apparatus comprising a reference circuit including voltage means connected to the load circuit for establishing an initial voltage level, a voltage change circuit connected to the reference circuit, means for impressing on said voltage change circuit voltage changes parallel to load circuit changes, and power means connected to the voltage change circuit including mechanism for opening the load circuit and simultaneously setting up an indication of the degree of voltage change in said load circuit, said power means being made operative on change of voltage in said voltage change circuit.

2. In an electrical system, a load circuit, and voltage change indicating apparatus connected therewith, said apparatus comprising a reference circuit including voltage means connected to the load circuit for establishing an initial voltage level, a voltage change circuit connected to the reference circuit, means for impressing on said voltage change circuit voltage changes parallel to load circuit changes, an indicator, and power means connected to the voltage change circuit and indicator including mechanism for actuating the indicator to show the degree of change of load circuit voltage, said power means being effective after the voltage change has been completed.

3. In an electrical system, a load circuit, and voltage change indicating apparatus connected therewith, said apparatus comprising a reference circuit including voltage means connected to the load circuit for establishing an initial voltage level, a voltage change circuit connected to the reference circuit, means for impressing on said voltage change circuit voltage changes parallel to load circuit changes, circuit control means, and power means connected to the voltage change circuit and control means including mechanism made operative on voltage change in said load circuit voltage for energizing said control means.

4. In an electrical system, a load circuit, and voltage change apparatus connected therewith, said aparatus comprising a reference circuit including voltage means connected to the load circuit for establishing an initial voltage level, a voltage change circuit connected to the reference circuit, means for impressing on said voltage change circuit voltage changes parallel to load circuit changes, circuit control means, and power means connected to the voltage change means, control means including mechanism made operative on voltage change in said load circuit voltage for energizing said control means, and means connected to the power means for prolonging energization of the power means after completion of load voltage change including a grid controlled tube and a capacitor normally charged on energization of said power means to maintain the grid of the tube at full current flow conditions whereby the full power of the power means is made effective.

5. In an electrical system, a load circuit, and voltage change indicating apparatus connected therewith, said apparatus comprising a reference circuit including voltage means connected to the load circuit for establishing an initial voltage level, a voltage change circuit connected to the reference circuit, means for impressing on said voltage change circuit voltage changes parallel to load circuit changes, an indicator, and power means connected to the voltage change circuit and indicator including mechanism for actuating the indicator to show the degree of change of load circuit voltage and for opening the load circuit, said voltage change indication being maintained on the indicator after the opening of the load circuit whereby the reading of the indicator may be properly accomplished.

6. In an electrical system, a load circuit, and voltage change indicating apparatus connected therewith, said apparatus comprising a reference circuit including voltage means connected to the load circuit for establishing an initial voltage level, a voltage change circuit connected to the reference circuit, means for impressing on said voltage change circuit voltage changes parallel to load circuit changes, an indicator, and power means connected to the voltage change circuit and indicator including mechanism for actuating the indicator to show the degree of change of load circuit voltage, and means for maintaining the voltage change indication after the change has been completed, whereby the reading of the indicator may be properly accomplished.

7. In an electrical system, a load circuit, and voltage change apparatus connected therewith, said apparatus comprising a reference circuit including voltage means connected to the load circuit for establishing an initial voltage level, a normally balanced bridge circuit connected to said reference circuit, a change of voltage in the load circuit unbalancing said bridge, power means including an associated power circuit made operative by the unbalancing of said bridge for energizing said power circuit and circuit means connected to said load bridge circuits for unbalancing said bridge.

8. In an electrical system, a load circuit, and voltage change indicating apparatus connected therewith, said apparatus comprising a reference circuit including voltage means connected to the load circuit for establishing an initial voltage level, a normally balanced first bridge circuit connected to said reference circuit, a change of voltage in the load circuit unbalancing said bridge, a second bridge connected to said first bridge and adapted for energization by the unbalancing of the first bridge, said second bridge including a control means, and means connected to said load circuit and first bridge circuit for unbalancing said first bridge with change of load voltage.

9. In an electrical system, a load circuit, and voltage change indicating apparatus connected therewith, said apparatus comprising a reference circuit including voltage means connected to the load circuit for establishing an initial voltage level, a normally balanced first bridge circuit connected to said reference circuit, a change of voltage in the load circuit unbalancing said bridge, a second bridge connected to said first bridge and adapted for energization by the unbalancing of the first bridge, said second bridge including a control means, a capacitor connected in parallel with both of said bridges, and means for making said capacitor electrically effective on said second bridge after deenergization of said first bridge, and means connected to said load circuit and first bridge circuit for unbalancing said first bridge with change of load voltage.

10. In an electrical system, a load circuit, a voltage change apparatus connected therewith, said apparatus comprising a reference circuit including voltage maintaining means connected to the load circuit for establishing an initial fixed voltage level, a bridge circuit connected to said reference and load circuits having output terminals subject to voltage change on load circuit change, and power means including an associated power circuit connected to said bridge output terminals and made operative by voltage change on said bridge.

11. In a welding system, coacting electrodes adapted to receive a workpiece, a power source for supplying power to said electrodes, control means for control of power from said power source, a reference circuit including voltage maintaining means connected to the load circuit for establishing an initial fixed voltage level corresponding to electrode voltage prior to weld, a bridge circuit connected to said reference circuit and electrodes having output terminals subject to voltage change on electrode voltage change, and power means including an associated power circuit connected to said bridge output terminals and control means and made operative by voltage change on said bridge to energize said control means.

EDWIN M. CALLENDER.

REFERENCES CITED

The following references are of record in the file of this patent:

UNITED STATES PATENTS

| Number | Name | Date |
|---|---|---|
| 2,149,558 | Stansbury et al. | Mar. 7, 1939 |
| 1,959,690 | Roth | May 22, 1934 |
| 2,081,987 | Dawson | June 1, 1937 |
| 2,306,593 | Collom | Dec. 29, 1942 |